United States Patent Office 3,518,216
Patented June 30, 1970

3,518,216
CORRUGATED PAPERBOARD COMPOSITION
Wildon T. Harvey, Hockessin, Del., and Jay C. Knepper, Jr., Princeton, N.J., assignors to Sun Oil Company, Philadelphia, Pa., a corporation of New Jersey
No Drawing. Continuation-in-part of application Ser. No. 364,832, May 4, 1964. This application July 6, 1967, Ser. No. 651,364
Int. Cl. C08f 45/52; D21h 1/36
U.S. Cl. 260—28.5                                    2 Claims

ABSTRACT OF THE DISCLOSURE

A corrugated paperboard composition having improved wet stiffness comprising corrugated paperboard impregnated with 25 to 50 weight percent of a composition consisting essentially of a specific petroleum paraffin wax containing 0.2 to 2.0 weight percent synthetic petroleum polymer resin.

CROSS REFERENCE TO RELATED APPLICATIONS

This application is a continuation-in-part of U.S. patent application Ser. No. 364,832, filed May 4, 1964, and now abandoned.

BACKGROUND OF THE INVENTION

The present invention relates to an improved corrugated paperboard composition. More particularly, the present invention relates to a novel corrugated paperboard composition which has improved wet stiffness properties comprising corrugated paperboard impregnated with a novel wax-petroleum polymer composition.

For many years corrugated paperboard used in box manufacturing has been made with a bituminous layer interposed between intermediate plies of the sheet in order to render the corrugated paperboard resistant to water vapor transmission. This has provided corrugated paperboard which is relatively impermeable to water vapor transmission and is inexpensive to manufacture.

However, this type of corrugated paperboard has been found to be lacking in wet strength properties necessary for stacking, especially when in direct contact with water or when exposed to a moisture-laden atmosphere for prolonged periods of time. This loss of wet strength is attributed to moisture absorbance of the outer unprotected surfaces of the corrugated paperboard.

Waxes have long been used in coating paper, cloths, fibers, food, and paperboard products to render them moisture vapor resistant. However, it has been found that unmodified waxes have a tendency to crack and peel. This disadvantage is overcome to some degree by addition of polyethylene and other polymers and copolymers. However, the expense, the high temperatures necessary for blending such mixtures, and the relative incompatibility of some of these polymer additives are disadvantages of these compositions in paperboard applications.

DESCRIPTION OF THE INVENTION

The present invention provides a paperboard for use in corrugated boxes which has all of the attractive properties of more expensive compositions and yet is relatively inexpensive to manufacture because of the low concentration of additive necessary to achieve the desired effect. It is among the objects of this invention to provide an inexpensive wax-polymer composition to render corrugated paperboard relatively impermeable to water and thereby improve the wet strength properties of that paperboard. It is among the objects of this invention to provide an improved corrugated paperboard composition comprising a base paperboard impregnated with a thermoplastic homogeneous mixture of 98.0 to 99.8 percent of a specific petroleum paraffin wax and 0.2 to 2.0 percent of a thermoplastic synthetic petroleum polymer resin obtained by the polymerization of olefins and diolefins prepared by the steam cracking of petroleum fractions, said resins having an ASTM ring and ball melting point range of 125° to 250° F., with said mixture comprising 25 to 50 percent and preferably 35 to 45 percent by weight of the total paperboard composition. Preferably, the average molecular weight is in the range from about 500 to 2500, more preferably about 1000 to 2000.

The steam-cracked petroleum resins used in this invention are made by mild Friedel-Crafts polymerization of a highly unsaturated liquid boiling in the vicinity of the naphtha boiling range, and containing mostly $C_6$ to $C_9$ hydrocarbons resulting from the steam cracking of petroleum fractions such as naphtha, kerosene, gas, oil, etc., with about 50 to 100 mole percent of steam at temperatures of about 1000° to 1500° F. Generally, in commercial operations butadiene is removed and usually also the isoprene. The resulting liquid which is available for use as polymerization feed to make the resin may have a boiling range of about 20° to 280° C., depending upon the boiling range of the cracking feed and conditions used for the steam-cracking operation. Thus the polymerization feed may have various boiling ranges, e.g., from 20° to 170° C., or from about 30° to 280°, etc. The distribution of the constituents within these fractions may, of course, vary somewhat, but may be illustrated as follows for a feed having an over-all boiling range of 20° to 170° C.

| Boiling range of fraction (° C.): | Percent by weight |
|---|---|
| 20–70 | 0–60 |
| 70–130 | 65–40 |
| 130–170 | 35–0 |

In general, the over-all chemical composition of this polymerization feed is as follows:

| Composition: | Percent |
|---|---|
| Aromatics | 19–49 |
| Diolefins | 8–25 |
| Olefins | 68–30 |
| Paraffins and naphthenes | 5–1 |

As steam-cracked petroleum fractions may contain a small amount of cyclodienes such as cyclopentadiene, methylcyclopentadiene, etc., and since it is preferred to exclude such cyclodienes from the polymerization feed for the purposes of the present invention, the steam-cracked naphtha is subjected to heating to about 90°–140° C. to dimerize the cyclodienes, and then carefully distilled to take the $C_5$ to $C_9$ constituents overhead and to leave as residue the dimerized cyclodienes. The resulting cyclodiene-free steam-cracked petroleum naphtha (for instance, a fraction boiling from about 20 to 140° C.) would have a chemical composition about as follows:

| Composition: | Percent |
|---|---|
| Benzene | 15–30 |
| Toluene | 3–10 |
| $C_8$ aromatics | Below 1 |
| Diolefins | [1] 11–25 |
| Olefins | [1] 70–29 |
| Paraffins | 0–5 |

[1] The only reactants in polymerization.

It should be noted that since the polymerization process used for making the resin is relatively mild, the benzene and toluene or other aromatics and paraffins do not enter into the reaction but merely act as diluents and are subsequently removed when the resin is stripped of volatile solvent and low-boiling polymerization products.

The polymerization is generally carried out at about −40° C. to +70° C. with about 0.25 to 3.0 percent of a Friedel-Crafts catalyst such as $AlCl_3$, $BF_3$, $TiCl_4$, etc., as, for instance, a temperature of 25° C. with 1 percent of powdered $AlCl_3$ (of about 30 mesh) as catalyst. When the polymerization is finished, the reactor contents may be washed with 5 percent aqueous NaOH and several times with water and then heated under vacuum, e.g., 5 to 50 mm. pressure absolute, to strip off volatile constituents and leave a light-colored resin. By stripping to higher temperatures and under higher vacuum conditions, the softening point of the resin may be raised from the vicinity of 150° F. to 212° or 215° F. These resins may be made by the processes outlined further in detail in U.S. Pat. Nos. 2,734,046, 2,770,613, and others.

Generally the improved corrugated paperboard compositions of the present invention are prepared by blending the petroleum paraffin wax and the petroleum polymer resin with constant agitation in an open vessel at a temperature sufficiently hot to melt either component individually and sufficient to maintain a homogeneous mixture. The temperature is usually within the range of 180°–250° F. according to the melting points of the individual components. The molten blends are maintained at the blending temperatures while the corrugated paperboard to be treated is totally immersed in the molten wax-polymer composition for at least 30 seconds and for as long as it is necessary to give a final wax resin content of 25 to 50 weight percent and preferably 35 to 45 weight percent of said impregnated corrugated paperboard.

The petroleum paraffin wax which forms a part of the compositions of the present invention is characterized as having a melting point in the range of 125° to 132° F., a penetration at 77° F. in the range of 17 to 23, a viscosity at 210° F. in the range of 36 to 39 SUS and a modulus of rupture at 73° F. of about 270 to 340. Procedures for recovering this specific petroleum paraffin wax from petroleum crude oil are disclosed in U.S. Pat. Nos. 2,624,501 and 2,906,443.

An illustration of one mode of the present invention is demonstrated in the following examples.

EXAMPLE I

A petroleum paraffin wax prepared according to the procedures disclosed in U.S. Pat. No. 2,624,501 and No. 2,906,443 having the following characteristics:

Melting point—129° F.
Penetration at 77° F.—18.
Viscosity at 210° F.—38.
Modulus of rupture at 73° F.—285.
Oil content—0.4 percent.

was heated to a temperature of 220° F., and a corrugated board blank was immersed in the molten wax for 30 seconds. The corrugated board is then removed and cooled.

EXAMPLE II

To 99.5 parts of a paraffin wax as described in Example I was blended at 220° F. a thermoplastic synthetic petroleum polymer resin obtained by the polymerization of olefins and diolefins prepared by the steam cracking of petroleum fractions, as described in U.S. Pat. Nos. 2,734,046, 2,770,613, and others, and having the following characteristics:

ASTM ball and ring softening point—212° F.
Specific Gravity at 25/25° C.—0.97.
Color, Gardener Scale—15.
Flash point (COC)—510° F.
Fine point (COC)—575° F.
Molecular weight—1400.
Acid number—1.
Saponification number—2.
Ash, weight percent—0.2.
Bromine number—36.
Iodine number—30.

A corrugated paperboard blank identical to the blank used in Example I was immersed in this wax-polymer mixture for 30 seconds at 220° F. and then removed and cooled.

EXAMPLE III

A homogeneous mixture of 99.0 percent paraffin wax as described in Example I and 1.0 percent petroleum polymer resin described in Example II was blended at 220° F., and a corrugated paperboard blank identical to that used in Example I was immersed in said homogeneous mixture for 30 seconds and removed and cooled.

EXAMPLE IV

A homogeneous mixture of 98.7 percent of paraffin wax as described in Example I and 1.3 percent of petroleum polymer resin described in Example II was blended at 220° F., and a corrugated paperboard blank identical to that used in Example I is immersed in said homogeneous mixture for 30 seconds, removed, and cooled.

EXAMPLE V

A homogeneous mixture of 98.0 percent paraffin wax as described in Example I and 2.0 percent petroleum polymer resin as described in Example II is blended at 220° F., and a corrugated paperboard blank identical to that used in Example I was immersed in said homogeneous mixture for 30 seconds, removed, and cooled.

The samples of corrugated paperboard which were treated according to the conditions set forth in Examples I to V were all subjected to identical conditions in the following test procedure.

A section of the wax polymer impregnated corrugated board was subdivided into three 4 inch by 4 inch sections. These sections were immersed in 36° F. water for 2 hours, simulating extremes of high humidity cold storage. After 2 hours the test specimens were removed, and three 1 inch by 4 inch sections with the 4-inch edge perpendicular to the flutes were cut from the inner part of the specimens. The stiffness of these sections were measured on both sides using the Tinius-Olsen Stiffness Tester of a 6 inch-pound moment capacity. The force required in pounds per inch squared to give a 3° deflection as measured on the stiffness tester was recorded. Measurements are made both parallel and perpendicular to the flutes of a corrugated board specimen. The average of six measurements was determined and was recorded in the following table. A sample of untreated corrugated board tested under the given conditions was too limp to measure. Stiffness was estimated to be approaching zero. The results of the testing of each of the compositions prepared according to the procedures disclosed in the examples above are presented in the table which follows.

TABLE I

| Example | Paraffin wax | Petroleum polymer resin | Wet stiffness lb./in.² average | Wt. percent wax blend | Wet stiffness average, lb./in.² per percent wax pick-up |
|---|---|---|---|---|---|
| Blank | 0 | 0 | (¹) | 0 | 0 |
| I | 100 | 0 | 255 | 39 | 6.5 |
| II | 99.5 | 0.5 | 390 | 41 | 9.5 |
| III | 99.0 | 1.0 | 510 | 42 | 12.2 |
| IV | 98.7 | 1.3 | 440 | 41 | 10.0 |
| V | 98.0 | 2.0 | 370 | 40 | 9.2 |

¹ Unmeasurable.

The examples given above clearly demonstrate that a blend of 0.2 to 2.0 parts of a petroleum polymer resin herein described and the specific petroleum paraffin wax disclosed herein provides a thermoplastic wax-polymer composition which imparts superior wet strength to corrugated paperboard impregnated with that composition when compared to a paperboard impregnated with unmodified paraffin wax. The wet strength improvement increases with increasing concentrations of added petroleum resin until the maximum strength imparted to said paperboard is reached at about 1.0 percent of additive. A surprising synergistic effect is noted in the improvement of wet strength characteristics of paperboard impregnated with the herein-described specific thermoplastic wax-petroleum polymer blend.

What is claimed is:

1. An improved corrugated paperboard composition which comprises corrugated paperboard impregnated with 25 to 50 weight percent based on the total weight of the paperboard composition of a thermoplastic composition consisting essentially of
   (a) 98.0 to 99.8 weight percent of a petroleum paraffin wax characterized as having
       (1) a melting point in the range of 125°–132° F.,
       (2) a viscosity at 210° F. in the range of 36–39 SUS,
       (3) a modulus of rupture at 73° F. in the range of 270 to 340, and
   (b) 0.2 to 2.0 weight percent of a thermoplastic synthetic petroleum polymer resin obtained by the Friedel-Crafts polymerization of olefins and diolefins prepared by the steam cracking of petroleum fractions, said resin being characterized as having an average molecular weight in the range of 500 to 2500 and a ring and ball melting point in the range of 125° to 250° C.

2. A composition according to claim 1 wherein the corrugated paperboard composition contains 35 to 45 weight percent of the thermoplastic composition.

References Cited

UNITED STATES PATENTS

| | | | |
|---|---|---|---|
| 2,906,443 | 9/1959 | Harvey | 208—21 |
| 2,967,116 | 1/1961 | Hollinger | 117—102 |
| 3,085,026 | 4/1963 | Weisgerber. | |
| 3,161,610 | 12/1964 | Weisgerber | 260—28.5 |

MORRIS LIEBMAN, Primary Examiner

U.S. Cl. X.R.

117—155